United States Patent
Matsuoka et al.

(10) Patent No.: US 11,753,172 B2
(45) Date of Patent: Sep. 12, 2023

(54) SEAT TRACK ASSEMBLY FOR USE IN AN AIR VEHICLE

(71) Applicant: The Boeing Company, Chicago, IL (US)

(72) Inventors: Alexander J. Matsuoka, Kirkland, WA (US); Mario A. Reyes, Bothell, WA (US); Michael-Lee Edward Frick, Shoreline, WA (US); Colin Kreiger, Lake Stevens, WA (US); Martin Grether, Payette, ID (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 17/380,813

(22) Filed: Jul. 20, 2021

(65) Prior Publication Data
US 2023/0026495 A1    Jan. 26, 2023

(51) Int. Cl.
*F16M 11/00*    (2006.01)
*B64D 11/06*    (2006.01)

(52) U.S. Cl.
CPC ................. *B64D 11/0696* (2013.01)

(58) Field of Classification Search
CPC ............. B64D 11/0696; B60N 2/0725; B60N 2002/0264; B60N 2/01558; H02G 3/0431; H02G 3/383; B64C 1/20
See application file for complete search history.

(56) References Cited

U.S. PATENT DOCUMENTS

| | | | |
|---|---|---|---|
| 7,086,874 B2 * | 8/2006 | Mitchell | B64D 11/06 244/118.6 |
| 7,191,981 B2 * | 3/2007 | Laib | B64D 11/0696 244/118.6 |
| 8,033,501 B2 * | 10/2011 | Callahan | H02G 3/00 244/118.6 |
| 8,708,410 B2 | 4/2014 | Scott et al. | |
| 2002/0144835 A1 * | 10/2002 | Samhammer | H02G 3/0487 174/72 A |
| 2005/0211835 A1 | 9/2005 | Henley et al. | |
| 2005/0230543 A1 | 10/2005 | Laib et al. | |
| 2005/0258676 A1 | 11/2005 | Mitchell et al. | |
| 2006/0049311 A1 | 3/2006 | Callahan et al. | |

OTHER PUBLICATIONS

Extended European Search Report and Written Opinion issued in European Patent Application Serial No. 22177841.8 dated Nov. 23, 2022; pp. 1-8.

* cited by examiner

*Primary Examiner* — Amy J. Sterling
(74) *Attorney, Agent, or Firm* — Armstrong Teasdale LLP

(57) ABSTRACT

A seat track assembly for use in a vehicle. The seat track assembly includes a floor joist including a main body extending in a longitudinal direction, a seat track channel defined in the main body, and at least one support flange extending in a lateral direction from the main body. A raceway is on the at least one support flange, wherein the raceway extends longitudinally along the floor joist, and has an interior sized to receive wiring therein. The seat track assembly also includes a track cover including a top plate. The raceway is positioned between the at least one support flange and the top plate, and the top plate extends past the raceway in the lateral direction.

20 Claims, 9 Drawing Sheets

SEAT TRACK ASSEMBLY FOR USE IN AN AIR VEHICLE

FIELD

The field relates generally to seating in an air vehicle and, more specifically, to a seat track system including a raceway conduit to provide a stable, flush, and adaptable routing method for wiring within the raceway conduit.

BACKGROUND

Passenger seating arrangements in commercial aircraft are relatively standardized. For example, multiple passenger seats may be connected together to form a set or row, and pluralities of sets may be staggered within the passenger cabin of the aircraft. A conventional passenger seat typically has a frame construction defining seat legs, a seat, and an adjustable backrest. At least some known aircraft have a track system installed on the floor of the passenger compartment, and the seat legs are installed within the track system. In addition, wiring that provides power, in-flight entertainment audio and video, connectivity, and lighting systems to each seat is installed along the floor of the passenger compartment. The wiring may be hidden within a conduit that is attached by adhesive to the floor, and the conduit may be covered with a flooring material such as carpet. Covering the conduit, or the shape of the conduit itself, may cause bumps and/or discontinuities to be formed in the floor covering, and seams need to be provided in the covering as wire breakout locations to the seats. Thus, these wire runs result in variably unpredictable configurations and layouts that are difficult to manage and install.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

One aspect is a seat track assembly for use in a vehicle. The seat track assembly includes a floor joist including a main body extending in a longitudinal direction, a seat track channel defined in the main body, and at least one support flange extending in a lateral direction from the main body. A raceway is on the at least one support flange, wherein the raceway extends longitudinally along the floor joist, and has an interior sized to receive wiring therein. The seat track assembly also includes a track cover including a top plate. The raceway is positioned above the support flange, and the top plate extends past the raceway in the lateral direction.

Another aspect is a vehicle including a floor joist having a main body extending in a longitudinal direction, a seat track channel defined in the main body, and at least one support flange extending in a lateral direction from the main body. A raceway extends in the longitudinal direction on the at least one support flange, and the raceway has an interior sized to receive wiring therein. The vehicle includes a flooring, at least a portion of which being adjacent the raceway in the lateral direction. The flooring includes a floor panel on the at least one support flange, and a floor covering on the floor panel. The vehicle also includes a track cover including a top plate. The raceway is positioned between the at least one support flange and the top plate, and the top plate extends, in the lateral direction, past the raceway.

Yet another aspect is an aircraft including a floor joist having a main body extending in a longitudinal direction, a seat track channel defined in the main body, and at least one support flange extending in a lateral direction from the main body. A first row of seats and a second row of seats are each coupled to the floor joist within the seat track channel. The first row and the second row are spaced from each other in the longitudinal direction. A raceway extends in the longitudinal direction on the at least one support flange, wherein the raceway has an interior sized to receive wiring therein. The aircraft includes a flooring, at least a portion of which being adjacent the raceway in the lateral direction. The flooring includes a floor panel on the at least one support flange, and a floor covering on the floor panel. The vehicle also includes a track cover including a top plate. The raceway is positioned above the at least one support flange, and the top plate extends, in the lateral direction, past the raceway and onto the floor covering.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
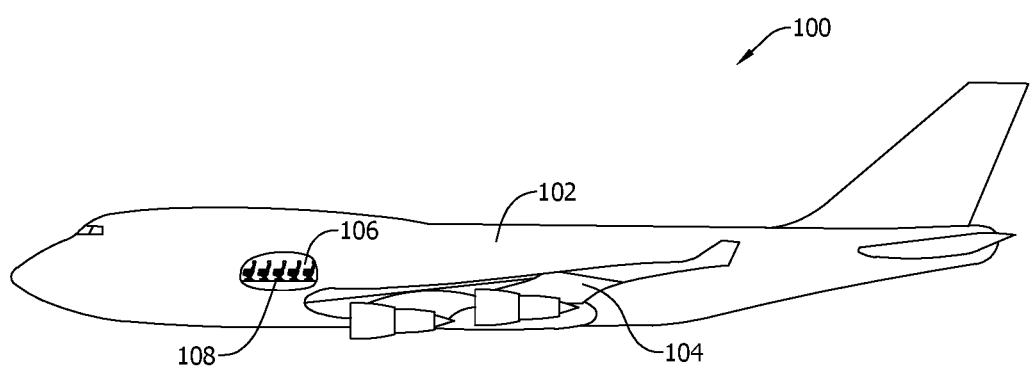
FIG. 1 is a side view illustration of an example aircraft.

FIG. 1 is a side view of an aircraft 100. In this example, aircraft 100 includes a fuselage 102 and a wing structure 104 extending from fuselage 102. Fuselage 102 defines a passenger compartment 106, and a plurality of passenger seats 108 are positioned within passenger compartment 106.

Figure 2:
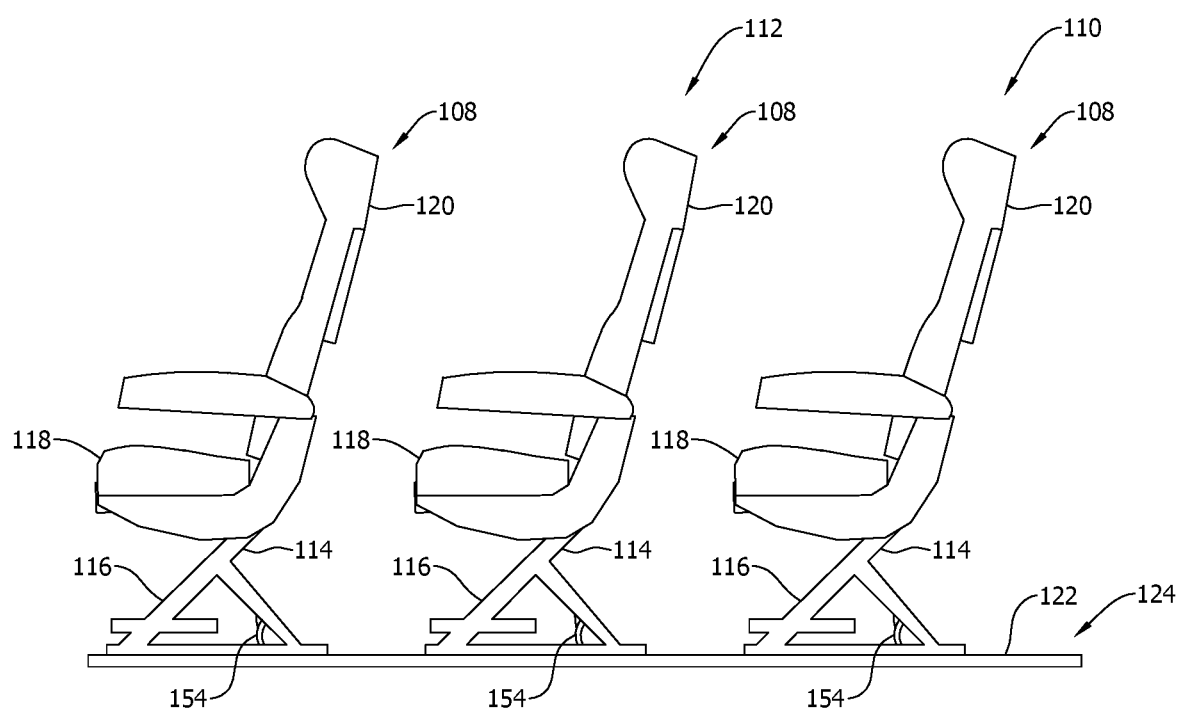
FIG. 2 is a side view illustration of passenger seats within the aircraft shown in FIG. 1.

FIG. 2 is a side view of passenger seats 108 within aircraft 100. Passenger seats 108 may be arranged in rows, including at least a first row 110 and a second row 112. In this example, each passenger seat 108 includes a frame 114 defining legs 116 of passenger seat 108, a seat bottom 118 coupled to frame 114, and a seat back 120 extending from seat bottom 118. Passenger seats 108 are coupled to a flooring 122 of passenger compartment 106. For example, as will be described in more detail below, legs 116 of passenger seats 108 may be coupled to flooring 122 along a track system 124 integrated within flooring 122.

Figure 3:
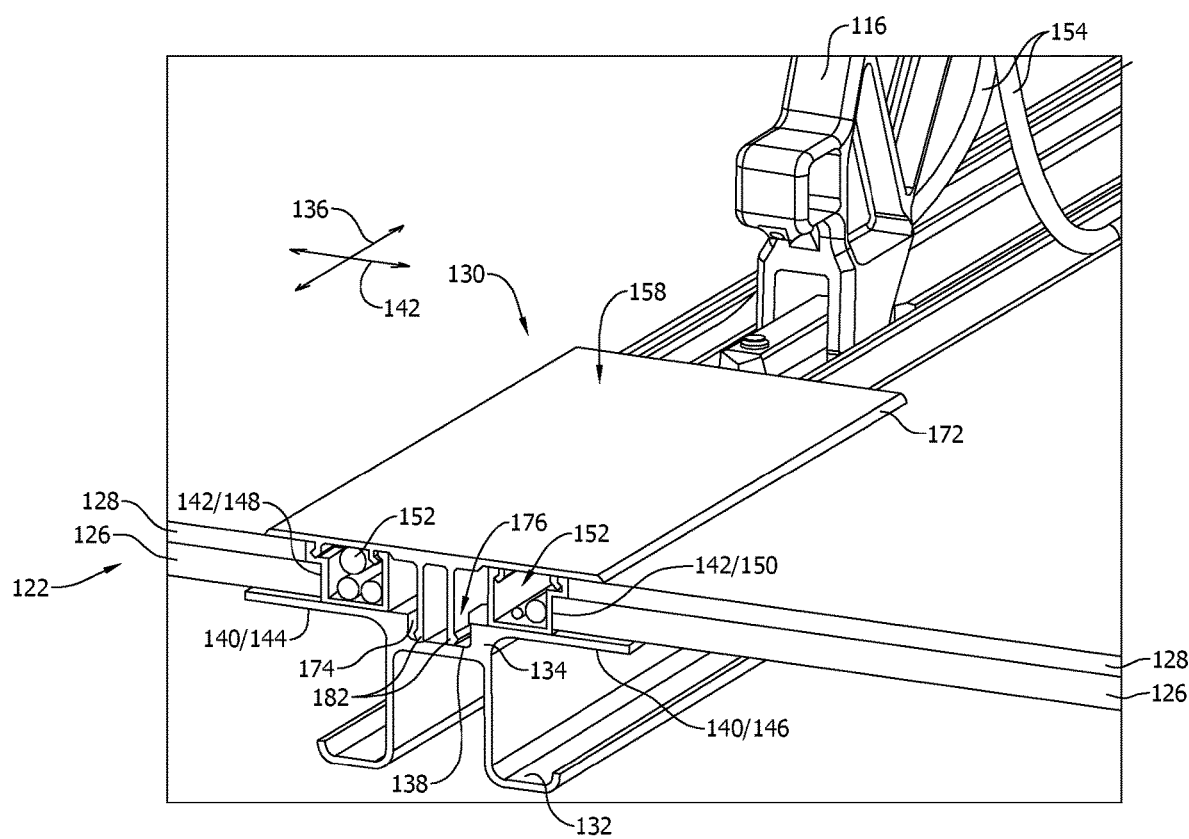
FIG. 3 is a perspective cutaway view of the flooring within a passenger compartment of the aircraft shown in FIG. 2, the view taken along Section 3 in FIG. 2.
Figure 4:
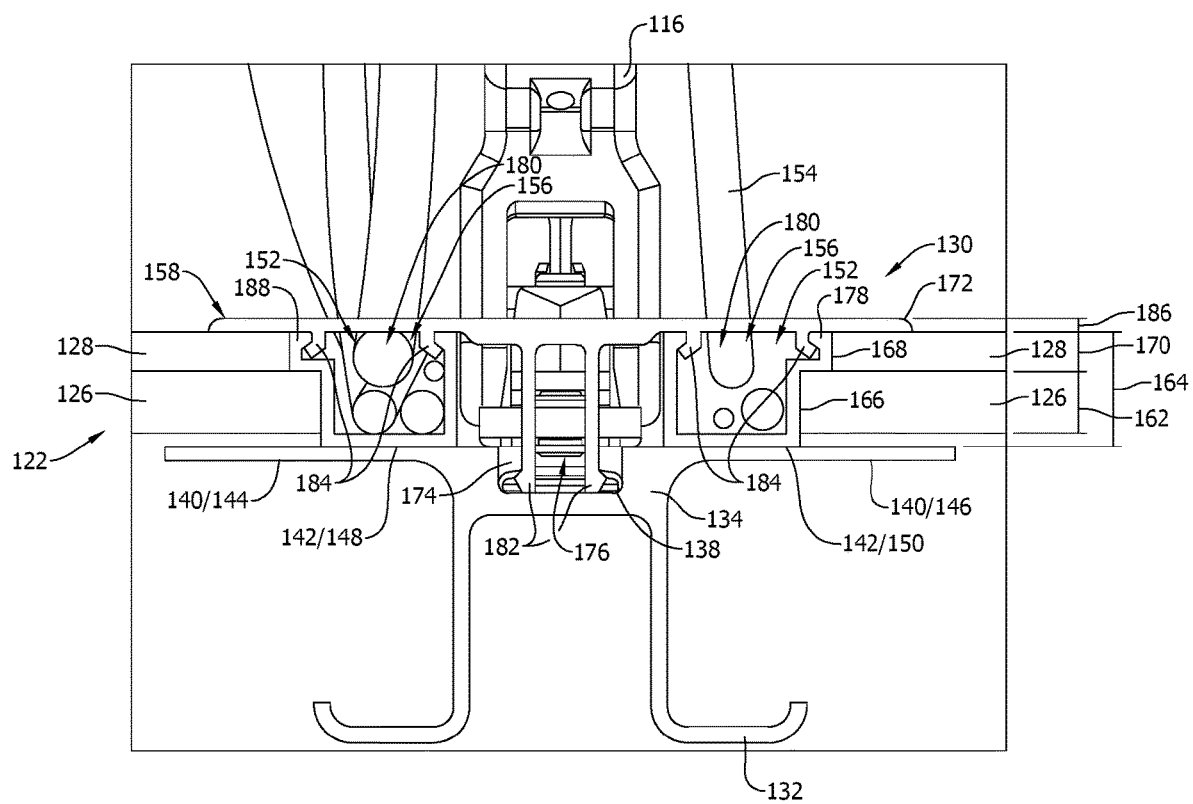
FIG. 4 is a cross-sectional view of the flooring shown in FIG. 3.

FIGS. 3 and 4 illustrate flooring 122 of passenger compartment 106. Flooring 122 includes a floor panel 126 and a floor covering 128 on floor panel 126. A seat track assembly 130 is integrated with flooring 122, as will be described in more detail below. Seat track assembly 130 includes a floor joist 132 that defines track system 124 used to secure passenger seats 108 within passenger compartment 106. Floor joist 132 has a main body 134 extending in a longitudinal direction 136 of aircraft 100 (shown in FIG. 1), and a seat track channel 138 defined in main body 134. Seat track channel 138 is sized and shaped to receive legs 116 of passenger seat 108 therein, which may then be secured in a fixed position within passenger compartment 106 with a fastener (not shown). Floor joist 132 also has at least one support flange 140 extending in a lateral direction 142 that is oriented generally orthogonal to longitudinal direction 136.

Figure 7:
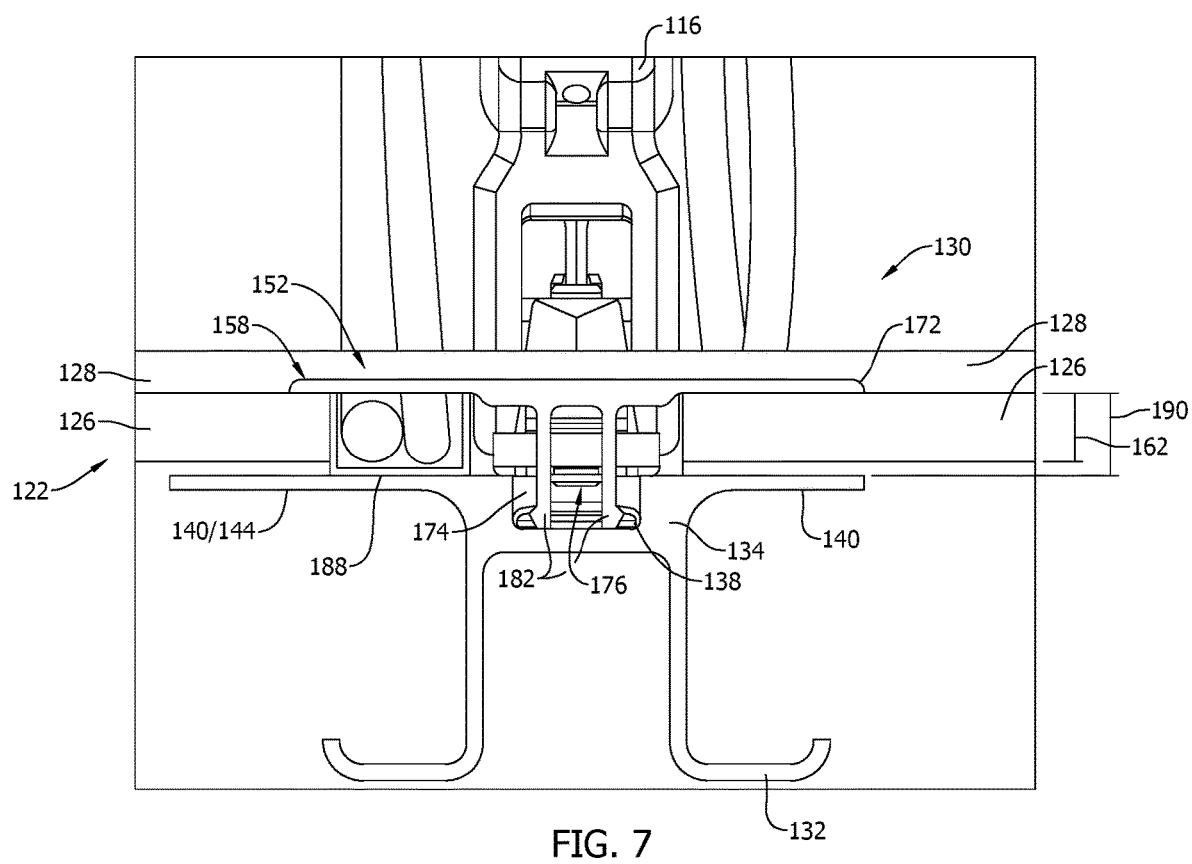
FIG. 7 is a cross-sectional view of an alternative flooring.

Seat track assembly 130 further includes a raceway 142 resting on the at least one support flange 140. For example, in one implementation, a first support flange 144 and a second support flange 146 extend from main body 134 in opposing lateral directions. Accordingly, a first raceway 148 is on first support flange 144, and a second raceway 150 is on second support flange 146 such that first and second raceways 148 and 150 are positioned on opposing sides of seat track channel 138. Each raceway 148 and 150 extends longitudinally along floor joist 132, and includes an interior 152 sized to receive wiring 154 therein that is to be routed along selected lengths of fuselage 102 (shown in FIG. 1). A top opening 156 in each raceway 148 and 150 provides access to interior 152 from passenger compartment 106, and seat track assembly 130 includes a track cover 158 for covering selected lengths of raceways 148 and 150 and blocking access to interior 152. In contrast, uncovered lengths of raceways 148 and 150, such as underneath passenger seats 108, provide access points 160 for wiring 154 to be routed between passenger seats 108 and seat track assembly 130 through top opening 156. In an alternative implementation, such as that illustrated in FIG. 7, seat track assembly 130 includes a single support flange 140 that is shorter than first support flange 144, and a single raceway 142 included on first support flange 144.

At least a portion of flooring 122 is adjacent raceways 148 and 150 in lateral direction 142. For example, in the illustrated embodiment, floor panel 126 is on support flanges 144 and 146 adjacent respective raceways 148 and 150. Accordingly, support flanges 144 and 146 are sized to support both a floor panel 126 and a raceway 142 thereon in lateral direction 142. In one embodiment, floor panel 126 has a thickness 162 that is less than a height 164 of raceway 142. In this embodiment, raceway 142 has a main section 166 defining interior 152, and a lip section 168 extending in lateral direction 142 from main section 166. Lip section 168 is shaped to provide a bonding area between floor panel 126 and raceway 142, and adhesive or fasteners may be used to couple raceway 142 to floor panel 126 and a respective support flange 140. Accordingly, lip section 168 extends across a top surface of floor panel 126 such that floor panel 126 is positioned between support flange 140 and lip section 168.

Floor covering 128 is positioned adjacent lip section 168 on floor panel 126. Floor covering 128 is designed to cover floor panel 126 and provide an appealing aesthetic to passengers within passenger compartment 106. Example floor coverings may include, but are not limited to including, a carpet material, a hard surface material, and the like. Floor covering 128 has a thickness 170, and the combined thicknesses 162 and 170 of floor panel 126 and floor covering 128 are generally equal to height 164 of raceway 142 to facilitate providing a substantially flush surface across flooring 122.

Seat track assembly 130 further includes track cover 158 having a length that extends in longitudinal direction 136 between first row 110 and second row 112 of passenger seats 108 (all shown in FIG. 2). Track cover 158 also extends over seat track channel 138 and raceways 148 and 150. For example, track cover 158 includes a top plate 172 that, when track cover 158 is installed onto flooring 122, extends past raceways 148 and 150 in lateral direction 142. Accordingly, track cover 158 restricts access to seat track channel 138 and to the interiors of the selected lengths of raceways 148 and 150.

Track cover 158 is removably coupleable from flooring 122. In this example, main body 134 of floor joist 132 includes a first retaining lip 174 defining a top opening 176 in seat track channel 138. Top opening 176 is sized to receive legs 116 of passenger seats 108 therein. In addition, each raceway 142 includes a second retaining lip 178 that defines a top opening 180 as well. Top opening 180 is sized to provide access to interior 152, as described above. In addition, track cover 158 includes a first coupling member 182 and a second coupling member 184 extending orthogonally or obliquely therefrom. First and second coupling members 182 and 184 are oriented for insertion through respective top openings 176 and 180, and are adapted to engage first and second retaining lips 174 and 178 with a snap fit. Coupling members 182 and 184 are adapted to facilitate the removable coupling of track cover 158 to and/or from first and second retaining lips 174 and 178. Thus, raceway 142 and track cover 158 are formed separately, and are selectively coupleable to and uncoupleable, from floor joist 132, thereby providing a maintenance benefit and reduced installation time of flooring 122 and seat track assembly 130.

As described above, track cover 158 extends past raceways 148 and 150 in lateral direction 142. Top plate 172 of track cover 158 has a substantially flat profile such that track cover 158 is offset relative to floor covering 128 as defined by a thickness 186 of top plate 172. Accordingly, positioning top plate 172 over floor covering 128 maintains a substantially flat profile across flooring 122 while continuing to provide ease of access to raceway 142 and seat track channel 138.

Figure 5:
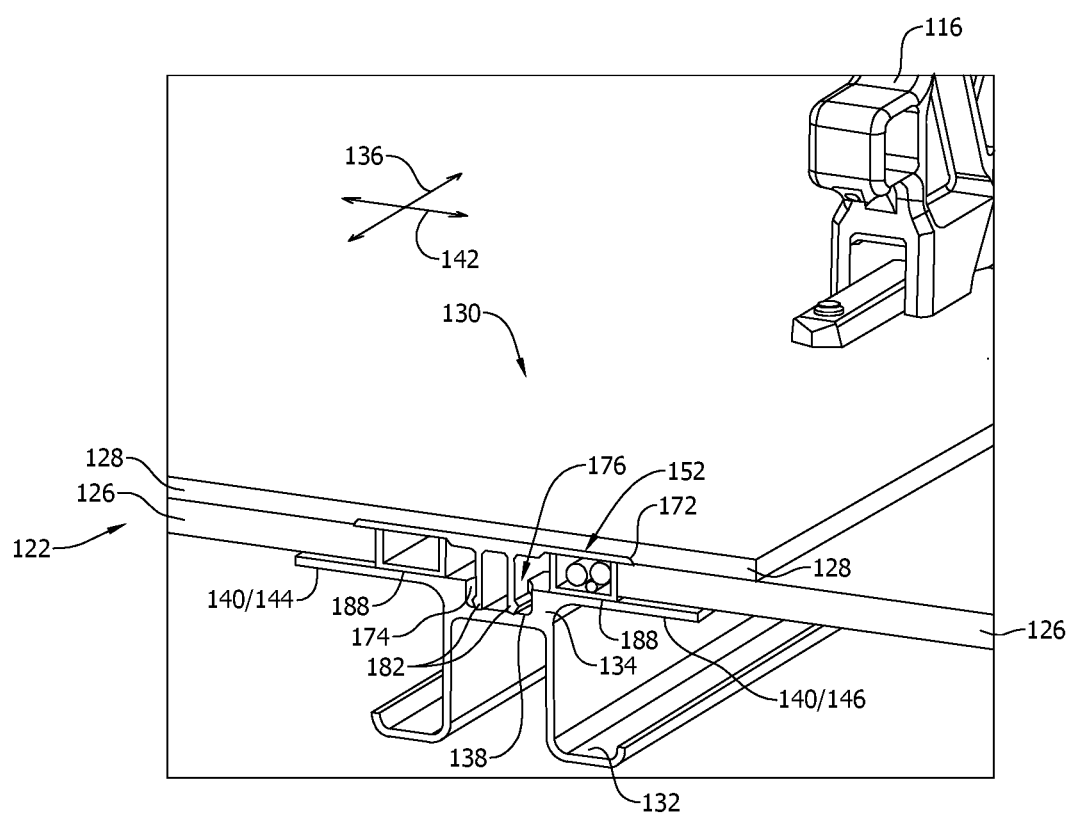
FIG. 5 is a perspective cutaway view of the flooring within a passenger compartment of the aircraft shown in FIG. 2, the view taken along Section 5 in FIG. 2.
Figure 6:
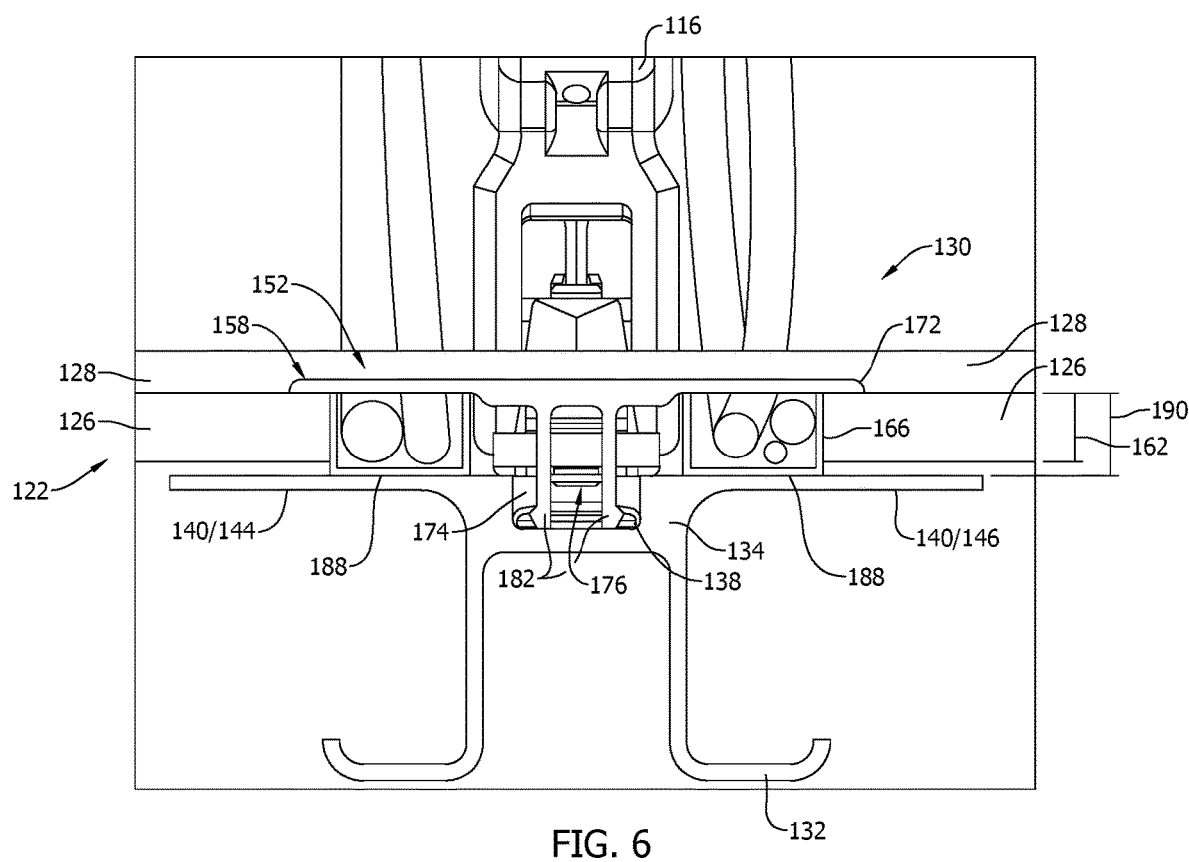
FIG. 6 is a cross-sectional view of the flooring shown in FIG. 5.

FIGS. 5 and 6 illustrate flooring 122 of passenger compartment 106. In the illustrated embodiment, raceways 188 do not include lip section 168, and raceways 188 have a height 190 that is substantially equal to a thickness 162 of floor panel 126. Top plate 172 of track cover 158 extends past raceways 188 and onto floor panel 126, and floor covering 128 covers both floor panel 126 and track cover 158. Accordingly, floor covering 128 maintains a substantially flat profile across flooring 122.

Figure 8:
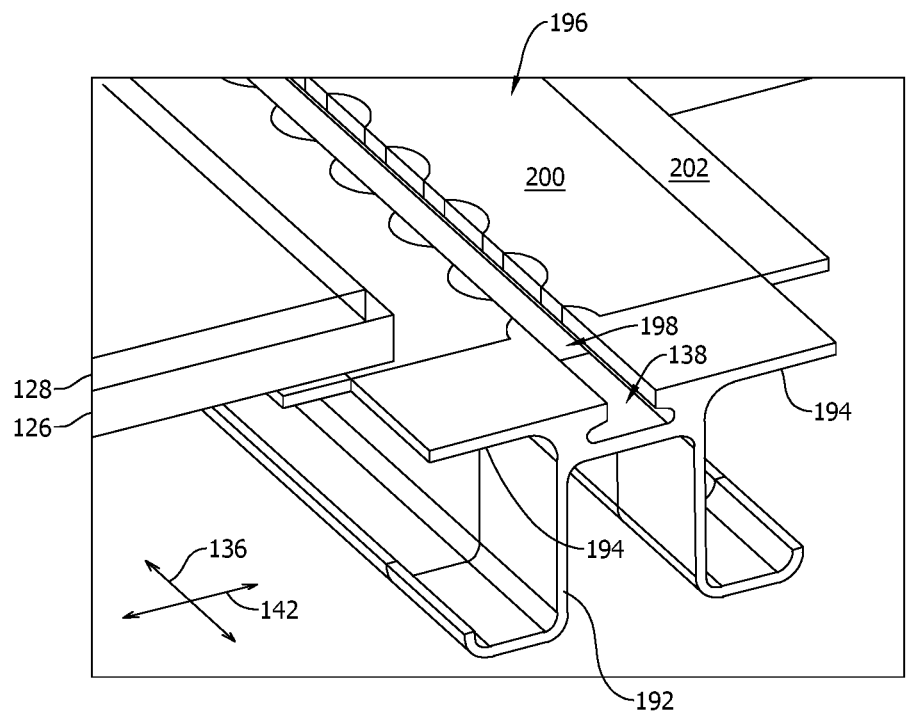
FIG. 8 is a perspective cutaway view of an example floor joist that may be used in the flooring shown in FIGS. 3-6.
Figure 9:
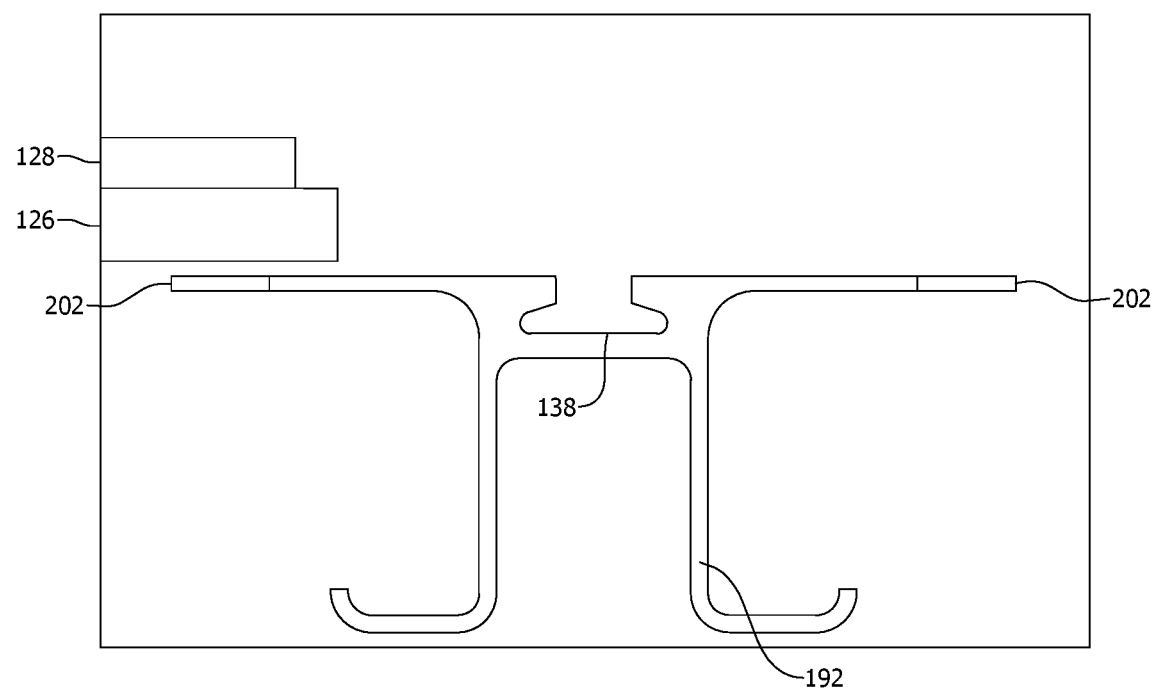
FIG. 9 is a cross-sectional view of the floor joist shown in FIG. 8.

FIGS. 8 and 9 illustrate flooring 122 of passenger compartment 106. In this example, flooring 122 include a floor joist 192 having at least one support flange 194 that has a reduced length in lateral direction 142 as compared to floor joist 132 (shown in FIG. 3). An extended support flange member 196 is coupled across floor joist 192. Extended support flange member 196 includes a seat track section 198, and a flange section 200 and an extended flange section 202 extending therefrom on either side of seat track channel 138. Extended support flange member 196 has a generally rigid body, which enables floor joist 192 to be retrofitted with the longer support flange of extended flange section 202. In addition, flange section 200 has a smaller thickness than extended flange section 202, which enables extended support flange member 196 to maintain a substantially flat profile across a top surface of floor joist 192.

Examples described include a seat track system that may be assembled with a raceway conduit to provide a stable, flush, and adaptable routing method for wiring within the raceway conduit. This system architecture provides a method of installation that is configurable to accommodate most, if not any, aircraft layout. An example system includes a floor joist with a wider flange adapted to support floor panels and other components, such as the raceway conduit. The raceway conduit is positioned laterally adjacent the floor panel on the flange in an otherwise unused space of the aircraft to eliminate extraneous congestion of wiring and associated protective coverings above the floor of the passenger compartment. Furthermore, the extended flange enables other commodities and furniture, that may have previously been limited due to limited flooring support, to be installed within the passenger compartment. Accordingly, the seat track system provides a stable, flush, and adaptable routing method that does not need to be re-engineered based on different aircraft layouts. The seat track system also allows the passenger seats to be re-pitched without removing the raceway conduits, and provides a maintenance benefit due to the ease of accessing and replacing damaged components thereof.

As used herein, an element or step recited in the singular and preceded with the word "a" or "an" should be understood as not excluding plural elements or steps, unless such exclusion is explicitly recited. Furthermore, references to "example", "example implementation" or "one implementation" of the present disclosure are not intended to be interpreted as excluding the existence of additional implementations that also incorporate the recited features.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art after reading this specification. Such other examples are intended to be within the scope of the claims if they have structural elements that do not differ from the literal language of the claims, or if they include equivalent structural elements with insubstantial differences from the literal language of the claims.

What is claimed is:

1. A seat track assembly for use in a vehicle, the seat track assembly comprising:
    a floor joist comprising a main body extending in a longitudinal direction, a seat track channel defined in the main body, and at least one support flange extending in a lateral direction from the main body;
    a raceway on the at least one support flange, wherein the raceway extends longitudinally along the floor joist, and comprises an interior sized to receive wiring therein; and
    a track cover comprising a top plate, wherein the raceway is positioned between the at least one support flange and the top plate, and wherein the top plate extends past the raceway in the lateral direction;
    wherein the main body comprises a first retaining lip that defines a top opening in the seat track channel, the track cover comprising a first coupling member oriented for insertion through the top opening to selectively engage the first retaining lip; and
    wherein the raceway comprises a second retaining lip that defines a top opening providing access to the interior, the track cover comprising a second coupling member oriented for insertion through the top opening to selectively engage the second retaining lip.

2. The seat track assembly in accordance with claim 1, wherein at least a portion of the at least one support flange extends past the raceway in the lateral direction, the portion of the at least one support flange adapted to support at least one of a floor panel or a floor covering of the vehicle.

3. The seat track assembly in accordance with claim 1, wherein the top plate has a flat profile.

4. The seat track assembly in accordance with claim 1, wherein the raceway and the track cover are formed separately, and are selectively coupleable to and uncoupleable from the floor joist.

5. A vehicle comprising:
    a floor joist comprising a main body extending in a longitudinal direction, a seat track channel defined in the main body, and at least one support flange extending in a lateral direction from the main body;
    a raceway extending in the longitudinal direction on the at least one support flange, wherein the raceway comprises an interior sized to receive wiring therein;
    a flooring, at least a portion of which being adjacent the raceway in the lateral direction, wherein the flooring comprises a floor panel on the at least one support flange, and a floor covering on the floor panel; and
    a track cover comprising a top plate, wherein the raceway is positioned between the at least one support flange and the top plate, and wherein the top plate extends, in the lateral direction, past the raceway
    wherein the main body comprises a first retaining lip that defines a top opening in the seat track channel, the track cover comprising a first coupling member oriented for insertion through the top opening to selectively engage the first retaining lip; and
    wherein the raceway comprises a second retaining lip that defines a top opening providing access to the interior, the track cover comprising a second coupling member oriented for insertion through the top opening to selectively engage the second retaining lip.

6. The vehicle in accordance with claim 5, wherein the track cover extends over the floor covering to facilitate providing a substantially flush surface across the flooring.

7. The vehicle in accordance with claim 5, wherein the floor covering extends over and covers the top plate of the track cover.

8. The vehicle in accordance with claim 5, wherein the track cover comprises a coupling member oriented to selectively engage at least one of the floor joist or the raceway.

9. The vehicle in accordance with claim 5, wherein the raceway comprises a main section defining the interior, and a lip section extending in the lateral direction from the main section, wherein the floor panel is positioned between the at least one support flange and the lip section.

10. The vehicle in accordance with claim 5, wherein the raceway and the track cover are formed separately, and are selectively coupleable to and uncoupleable from the floor joist.

11. An aircraft comprising:
- a floor joist comprising a main body extending in a longitudinal direction, a seat track channel defined in the main body, and at least two support flanges extending in a lateral direction from the main body;
- a first row of seats and a second row of seats each coupled to the floor joist within the seat track channel, the first row and the second row spaced from each other in the longitudinal direction;
- raceways extending in the longitudinal direction on the at least one support flange, wherein each raceway comprises an interior sized to receive wiring therein;
- a flooring, at least a portion of which being adjacent the raceway in the lateral direction, wherein the flooring comprises a floor panel on the at least one support flange, and a floor covering on the floor panel; and
- a track cover comprising a top plate, wherein each raceway is positioned between the at least one support flange and the top plate, and wherein the top plate extends, in the lateral direction, past each raceway and onto the floor covering to cover each raceway.

12. The aircraft in accordance with claim 11, wherein the track cover having a length that extends in the longitudinal direction between the first row and the second row of seats over the seat track channel.

13. The aircraft in accordance with claim 11, wherein the track cover extends in the lateral direction to facilitate providing a substantially flush surface across the interior of the raceway.

14. The aircraft in accordance with claim 11, wherein the track cover comprises a coupling member oriented to selectively engage at least one of the floor joist or the raceway.

15. The aircraft in accordance with claim 11, wherein the top plate comprises a top surface having a flat profile.

16. The aircraft in accordance with claim 11, wherein the raceway and the track cover are formed separately, and are selectively coupleable to and uncoupleable from the floor joist.

17. The seat track assembly in accordance with claim 1, wherein the track cover comprises a coupling member oriented to selectively engage at least one of the floor joist or the raceway.

18. The seat track assembly in accordance with claim 1, wherein the raceway comprises a main section defining the interior, and a lip section extending in the lateral direction from the main section.

19. The seat track assembly in accordance with claim 1, wherein the track cover extends in the lateral direction to facilitate providing a substantially flush surface across the interior of the raceway.

20. The seat track assembly in accordance with claim 1, wherein the top plate comprises a top surface having a flat profile.

* * * * *